US012573289B2

(12) United States Patent
Bradley et al.

(10) Patent No.: US 12,573,289 B2
(45) Date of Patent: Mar. 10, 2026

(54) METHOD AND APPARATUS FOR ROAD SEGMENT TRAFFIC TENDENCY DETERMINATIONS

(71) Applicant: HERE GLOBAL B.V., Eindhoven (NL)

(72) Inventors: Corinne Bradley, Chicago, IL (US); Arnold Sheynman, Northbrook, IL (US); Kyle Jackson, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 420 days.

(21) Appl. No.: 17/576,226

(22) Filed: Jan. 14, 2022

(65) Prior Publication Data

US 2023/0230472 A1 Jul. 20, 2023

(51) Int. Cl.
*G08G 1/01* (2006.01)
*G08G 1/052* (2006.01)

(52) U.S. Cl.
CPC ......... *G08G 1/0129* (2013.01); *G08G 1/0133* (2013.01); *G08G 1/0141* (2013.01); *G08G 1/052* (2013.01)

(58) Field of Classification Search
CPC .. G08G 1/0129; G08G 1/0133; G08G 1/0141; G08G 1/052; G08G 1/096716; G08G 1/096775
See application file for complete search history.

(56) References Cited

U.S. PATENT DOCUMENTS 8,103,435 B2 1/2012 Yang et al.
8,264,375 B2 9/2012 DeVries
9,123,239 B2 9/2015 Kurzhanskiy
2008/0004802 A1* 1/2008 Horvitz .............. G01C 21/3415 701/533
2017/0256162 A1* 9/2017 Schilling ............. G08G 1/0129
(Continued)

FOREIGN PATENT DOCUMENTS

CN 101710449 A 5/2010
CN 103903452 A 7/2014
(Continued)

OTHER PUBLICATIONS

G. Hobeika and Chang Kyun Kim, "Traffic-flow-prediction systems based on upstream traffic," Proceedings of VNIS'94—1994 Vehicle Navigation and Information Systems Conference, Yokohama, Japan, 1994, pp. 345-350, doi: 10.1109/VNIS.1994.396815 (Year: 1994).*
(Continued)

*Primary Examiner* — Anne Marie Antonucci
*Assistant Examiner* — Jingli Wang
(74) *Attorney, Agent, or Firm* — ALSTON & BIRD LLP

(57) ABSTRACT

A method, apparatus and computer program product are provided to estimate a road segment traffic tendency determination value. A current traffic speed pattern data object may be generated for an initial location of a vehicle and a future traffic speed pattern data object may be generated for an estimated downstream location of the vehicle. A road segment traffic tendency determination value may then be estimated based at least in part on the current traffic speed pattern data object and the future traffic speed pattern data object. A road segment traffic tendency notification may be provided to the vehicle.

15 Claims, 6 Drawing Sheets

(56) References Cited

U.S. PATENT DOCUMENTS

| | | | | |
|---|---|---|---|---|
| 2018/0211523 | A1* | 7/2018 | Ashida | G08G 1/0141 |
| 2019/0311615 | A1* | 10/2019 | Ashida | G08G 1/0141 |
| 2019/0325743 | A1* | 10/2019 | Nishioka | G06Q 50/40 |
| 2020/0143669 | A1* | 5/2020 | Mulcahy | G08G 1/0133 |
| 2020/0234570 | A1 | 7/2020 | Nishimura et al. | |
| 2020/0258381 | A1* | 8/2020 | Fowe | G06N 7/01 |

FOREIGN PATENT DOCUMENTS

| | | | | |
|---|---|---|---|---|
| CN | 105185107 | A | 12/2015 | |
| WO | WO-2016197937 | A1 * | 12/2016 | G01C 21/34 |

OTHER PUBLICATIONS

Preview of "Intelligent transport systems—Traffic and travel information via transport protocol experts group, generation (TPEG1) binary data format—Part 9: Traffic event compact (TPEG1-TEC)", ISO/TS 18234-9, First Edition, (Oct. 15, 2013), 19 pages.

"Intelligent Transport Systems (ITS)—Traffic and Travel Information (TTI) via Transport Protocol Experts Group, Generation 1 (TPEG1) Binary Data Format—Part 9: Traffic Event Compact Application (TPEG-TEC_3.0/001)", TISA Specification, (May 10, 2011), 112 pages.

* cited by examiner

METHOD AND APPARATUS FOR ROAD SEGMENT TRAFFIC TENDENCY DETERMINATIONS

TECHNOLOGICAL FIELD

An example embodiment relates generally to a method, apparatus and computer program product for road segment traffic tendency determinations and, more particularly, to a method, apparatus and computer program product for providing road segment traffic tendency notifications based at least in part on the road segment traffic tendency determination, to vehicles on a road segment.

BACKGROUND

Traffic estimation systems may provide traffic condition estimations for a given location at either a current moment in time or a future moment in time. Such traffic estimation engines may primarily rely on the speed of vehicles on the road segment when making such determinations.

BRIEF SUMMARY

A method, apparatus and computer program product are provided in accordance with an example embodiment in order to estimate a road segment traffic tendency determination value. In this regard, the method, apparatus and computer program product may generate a current traffic speed pattern (TSP) data object for an initial location of a vehicle and generate a future traffic speed pattern data object for the vehicle at an estimated downstream location at a future horizon timestamp value (e.g., a time 15 minutes in the future). A road segment traffic tendency determination value may be estimated based at least in part on the current TSP data object and the future TSP data object and a road segment traffic tendency notification which describes at least the road segment traffic tendency determination value may be provided to the vehicle. As such, operators of a vehicle may be informed of future traffic conditions in a more accurate and efficient way such that the vehicle operator is aware of how the current traffic condition will change in the future.

In an example embodiment, a method includes generating a current TSP data object for an initial location of a vehicle, wherein the current TSP data object comprises at least one of a current TSP attribute, a current speed moving average (SMA) attribute, or a current speed attribute. The method may further include generating a future TSP data object for the vehicle at an estimated downstream location based at least in part on the current TSP data object, wherein the future TSP data object comprises at least one of an estimated TSP attribute, an estimated SMA attribute, or an estimated speed attribute. The method may further include estimating a road segment traffic tendency determination value based at least in part on the current TSP data object and the future TSP data object. The method may further include causing a road segment traffic tendency notification to be provided to the vehicle, wherein the road segment traffic tendency notification describes at least the road segment traffic tendency determination value.

In some embodiments, the method further includes determining the estimated downstream location for the vehicle based at least in part on the current TSP data object for the vehicle and a future horizon timestamp change value.

In some embodiments, the method further includes determining one or more comparison values by comparing one or more attributes described by the current TSP data object to one or more attributes described by the future TSP data object. The method may further include determining whether the one or more comparison values satisfy one or more comparison value thresholds, wherein estimating the road segment traffic tendency determination value based at least in part on whether the one or more comparison values satisfy the one or more comparison value thresholds.

In some embodiments, the method further includes assigning a road segment traffic tendency category of a plurality of candidate road segment traffic tendency categories based at least in part on the road segment traffic tendency determination value.

In some embodiments, the plurality of candidate road segment traffic tendency categories may include a traffic increasing category, a traffic decreasing category, or no change category. In some embodiments, the road segment traffic tendency notification further comprises the future horizon timestamp change value and a downstream location value corresponding to the future TSP data object.

In some embodiments, the method further includes causing one or more navigational instructions to be provided to the vehicle based at least in part on the road segment tendency determination value.

In an example embodiment, an apparatus is configured with means for generating a current TSP data object for an initial location of a vehicle, wherein the current TSP data object comprises at least one of a current TSP attribute, a current SMA attribute, or a current speed attribute. The apparatus may further be configured with means for generating a future TSP data object for the vehicle at an estimated downstream location based at least in part on the current TSP data object, wherein the future TSP data object comprises at least one of an estimated TSP attribute, an estimated SMA attribute, or an estimated speed attribute. The apparatus may further be configured with means for estimating a road segment traffic tendency determination value based at least in part on the current TSP data object and the future TSP data object. The apparatus may further be configured with means for causing a road segment traffic tendency notification to be provided to the vehicle, wherein the road segment traffic tendency notification describes at least the road segment traffic tendency determination value.

In some embodiments, the apparatus may further be configured with means for determining the estimated downstream location for the vehicle based at least in part on the current TSP data object for the vehicle and a future horizon timestamp change value.

In some embodiments, the apparatus may further be configured with means for determining one or more comparison values by comparing one or more attributes described by the current TSP data object to one or more attributes described by the future TSP data object. The apparatus may further be configured with means for determining whether the one or more comparison values satisfy one or more comparison value thresholds, wherein estimating the road segment traffic tendency determination value based at least in part on whether the one or more comparison values satisfy the one or more comparison value thresholds.

In some embodiments, the apparatus may further be configured with means for assigning a road segment traffic tendency category of a plurality of candidate road segment traffic tendency categories based at least in part on the road segment traffic tendency determination value.

In some embodiments, the plurality of candidate road segment traffic tendency categories may include a traffic increasing category, a traffic decreasing category, or no change category. In some embodiments, the road segment traffic tendency notification further comprises the future horizon timestamp change value and a downstream location value corresponding to the future TSP data object.

In some embodiments, the apparatus may further be configured with means for causing one or more navigational instructions to be provided to the vehicle based at least in part on the road segment traffic tendency determination value.

In an example embodiment, an apparatus is disclosed, the apparatus comprising processor circuitry and at least one memory including computer program code, the at least one memory and the computer program code configured to, with the processing circuitry, cause the apparatus at least to generate a current TSP data object for an initial location of a vehicle, wherein the current TSP data object comprises at least one of a current TSP attribute, a current SMA attribute, or a current speed attribute. The at least one memory and the computer program code may further be configured to, with the processing circuitry, cause the apparatus at least to generate a future TSP data object for the vehicle at an estimated downstream location based at least in part on the current TSP data object, wherein the future TSP data object comprises at least one of an estimated TSP attribute, an estimated SMA attribute, or an estimated speed attribute. The at least one memory and the computer program code may further be configured to, with the processing circuitry, cause the apparatus at least to estimate a road segment tendency determination value based at least in part on the current TSP data object and the future TSP data object. The at least one memory and the computer program code may further be configured to, with the processing circuitry, cause the apparatus at least to cause a road segment traffic tendency notification to be provided to the vehicle, wherein the road segment tendency notification describes at least the road segment traffic tendency determination value.

In some embodiments, the at least one memory and the computer program code may further be configured to, with the processing circuitry, cause the apparatus at least to determine the estimated downstream location for the vehicle based at least in part on the current TSP data object for the vehicle and a future horizon timestamp change value.

In some embodiments, the at least one memory and the computer program code may further be configured to, with the processing circuitry, cause the apparatus at least to determine one or more comparison values by comparing one or more attributes described by the current TSP data object to one or more attributes described by the future TSP data object. The at least one memory and the computer program code may further be configured to, with the processing circuitry, cause the apparatus at least to determine whether the one or more comparison values satisfy one or more comparison value thresholds, wherein estimating the road segment tendency determination value based at least in part on whether the one or more comparison values satisfy the one or more comparison value thresholds.

In some embodiments, the at least one memory and the computer program code may further be configured to, with the processing circuitry, cause the apparatus at least to assign a road segment traffic tendency category of a plurality of candidate road segment traffic tendency categories based at least in part on the road segment traffic tendency determination value.

In some embodiments, the plurality of candidate road segment traffic tendency categories may include a traffic increasing category, a traffic decreasing category, or no change category. In some embodiments, the road segment traffic tendency notification further comprises the future horizon timestamp change value and a downstream location value corresponding to the future TSP data object.

In some embodiments, the at least one memory and the computer program code may further be configured to, with the processing circuitry, cause the apparatus at least to cause one or more navigational instructions to be provided to the vehicle based at least in part on the road segment traffic tendency determination value.

In an example embodiment, a computer program product is disclosed, the computer program product comprising at least one non-transitory computer-readable storage medium having computer-executable program code portions stored therein, the computer-executable program code portions comprising program code instructions configured to generate a current TSP data object for an initial location of a vehicle, wherein the current TSP data object comprises at least one of a current TSP attribute, a current SMA attribute, or a current speed attribute. The computer-executable program code portions comprising program code instructions may further be configured to generate a future TSP data object for the vehicle at an estimated downstream location based at least in part on the current TSP data object, wherein the future TSP data object comprises at least one of an estimated TSP attribute, an estimated SMA attribute, or an estimated speed attribute. The computer-executable program code portions comprising program code instructions may further be configured to estimate a road segment traffic tendency determination value based at least in part on the current TSP data object and the future TSP data object. The computer-executable program code portions comprising program code instructions may further be configured to cause a road segment traffic tendency notification to be provided to the vehicle, wherein the road segment traffic tendency notification describes at least the road segment traffic tendency determination value.

In some embodiments, the computer-executable program code portions comprising program code instructions may further be configured to determine the estimated downstream location for the vehicle based at least in part on the current TSP data object for the vehicle and a future horizon timestamp change value.

In some embodiments, the computer-executable program code portions comprising program code instructions may further be configured to determine one or more comparison values by comparing one or more attributes described by the current TSP data object to one or more attributes described by the future TSP data object. The computer-executable program code portions comprising program code instructions may further be configured to determine whether the one or more comparison values satisfy one or more comparison value thresholds, wherein estimating the road segment traffic tendency determination value based at least in part on whether the one or more comparison values satisfy the one or more comparison value thresholds.

In some embodiments, the computer-executable program code portions comprising program code instructions may further be configured to assign a road segment traffic tendency category of a plurality of candidate road segment traffic tendency categories based at least in part on the road segment traffic tendency determination value.

In some embodiments, the plurality of candidate road segment traffic tendency categories may include a traffic increasing category, a traffic decreasing category, or no change category. In some embodiments, the road segment traffic tendency notification further comprises the future horizon timestamp change value and a downstream location value corresponding to the future TSP data object.

In some embodiments, the computer-executable program code portions comprising program code instructions may further be configured to cause one or more navigational instructions to be provided to the vehicle based at least in part on the road segment traffic tendency determination value.

BRIEF DESCRIPTION OF THE DRAWINGS

Figure 1:
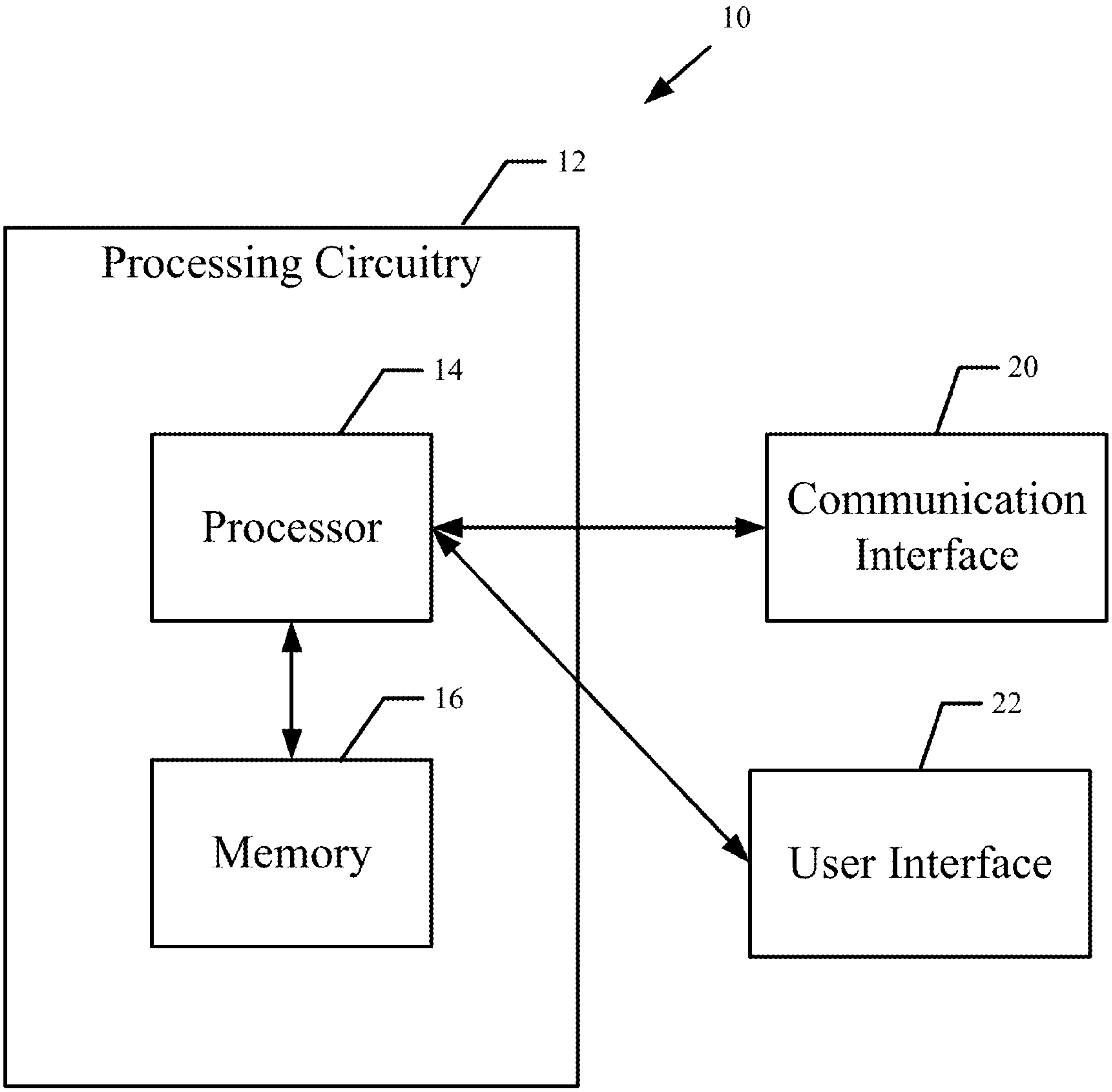
Figure 2:
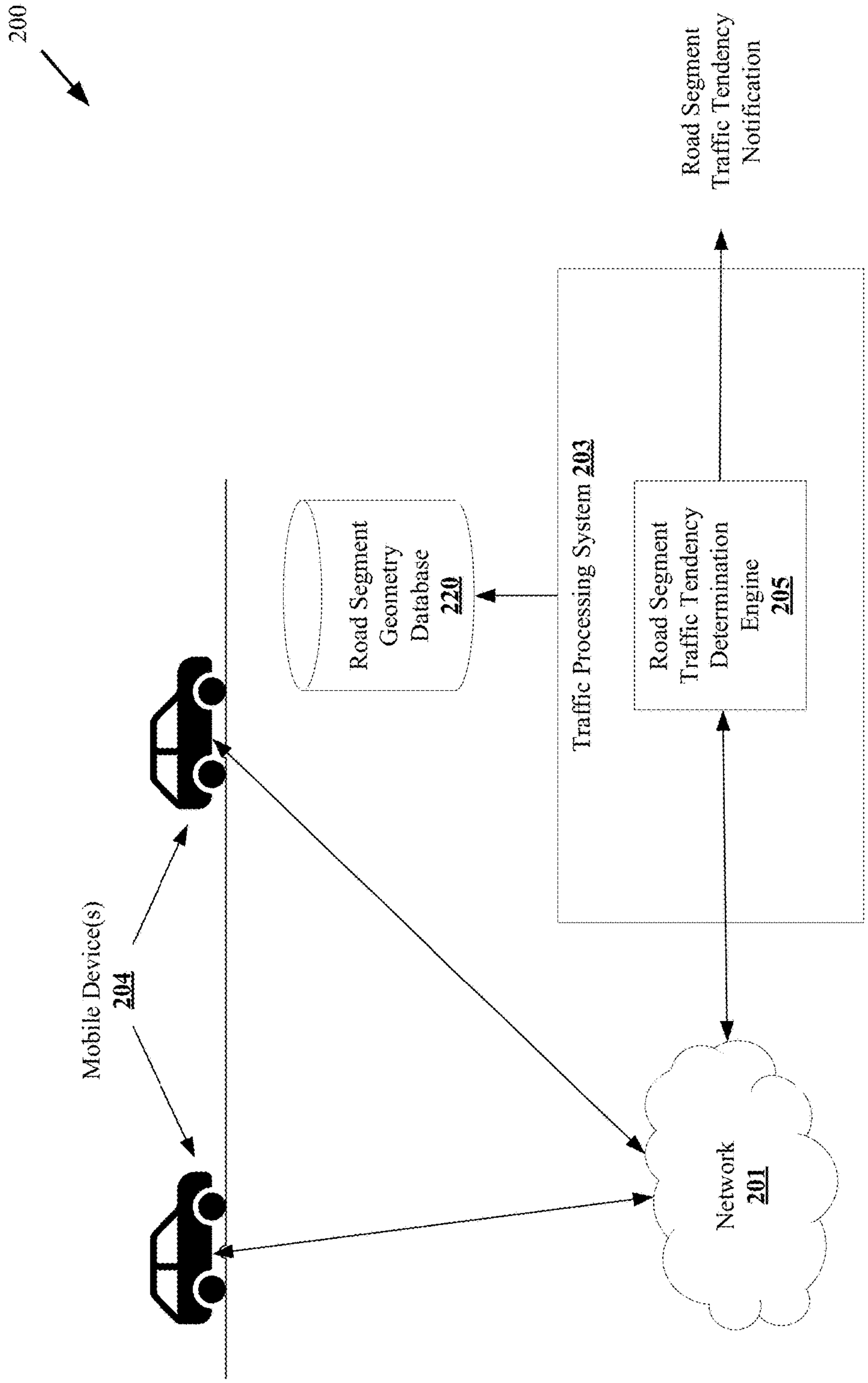
Figure 3:
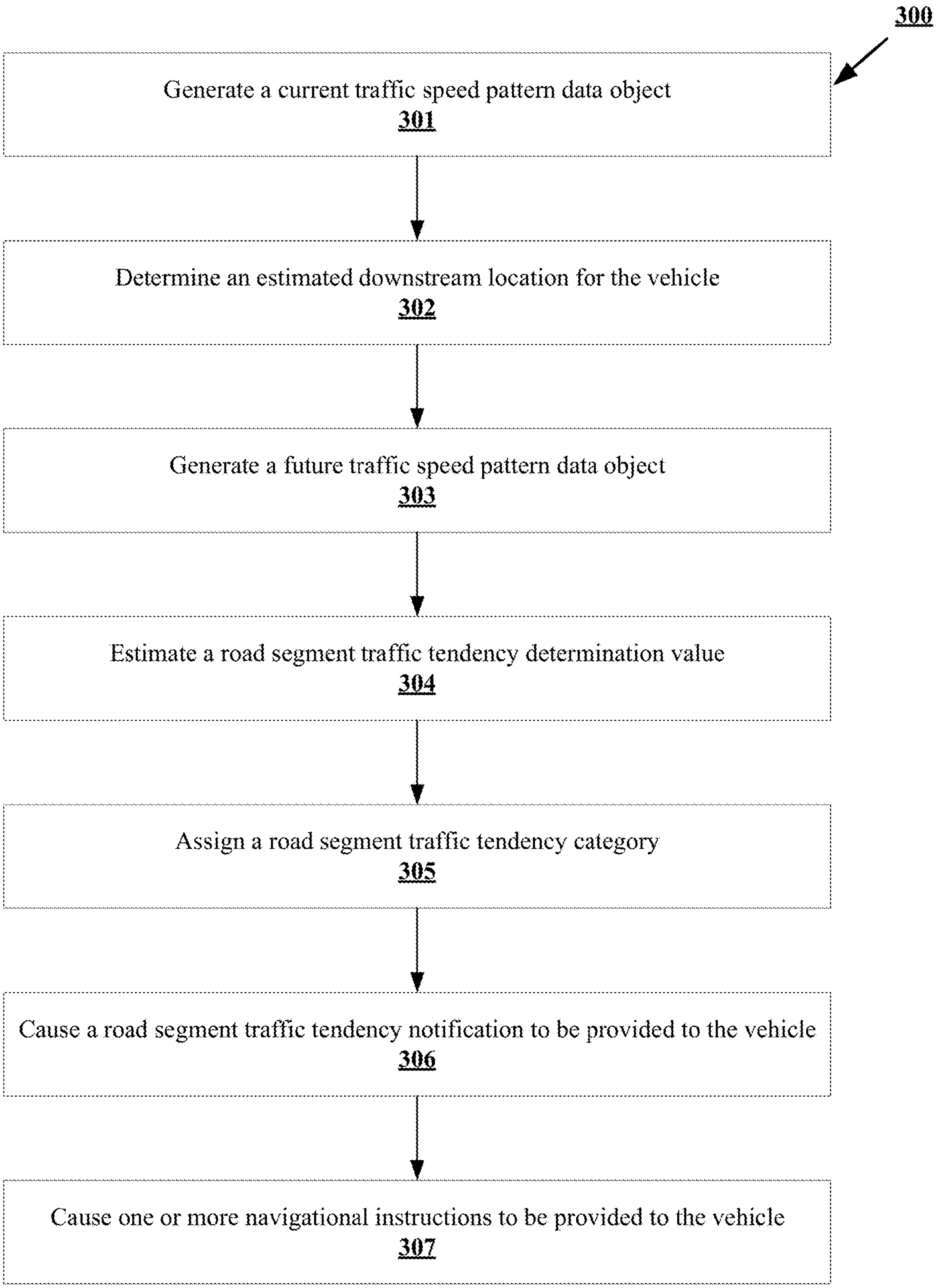
Figure 4:
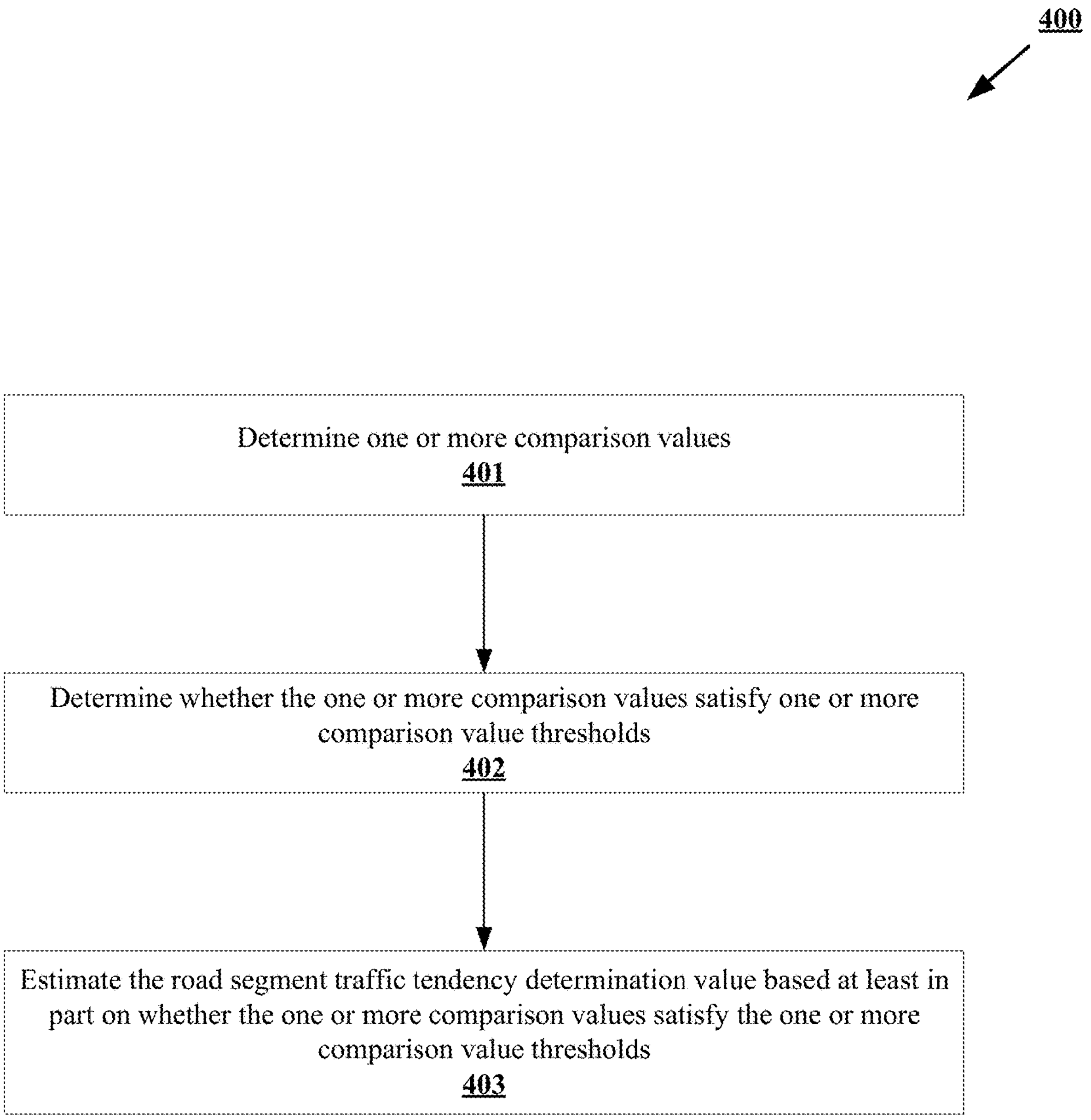
Figure 5A:
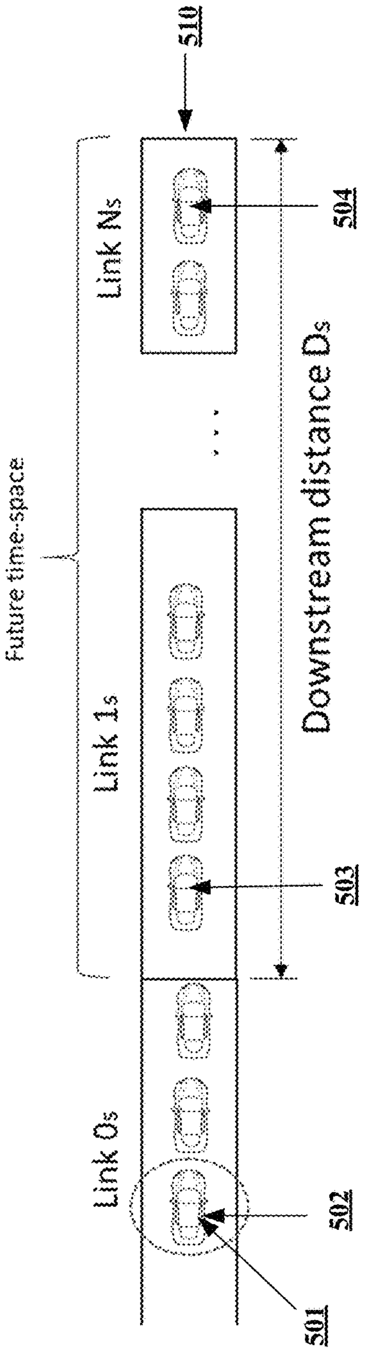
Figure 5B:
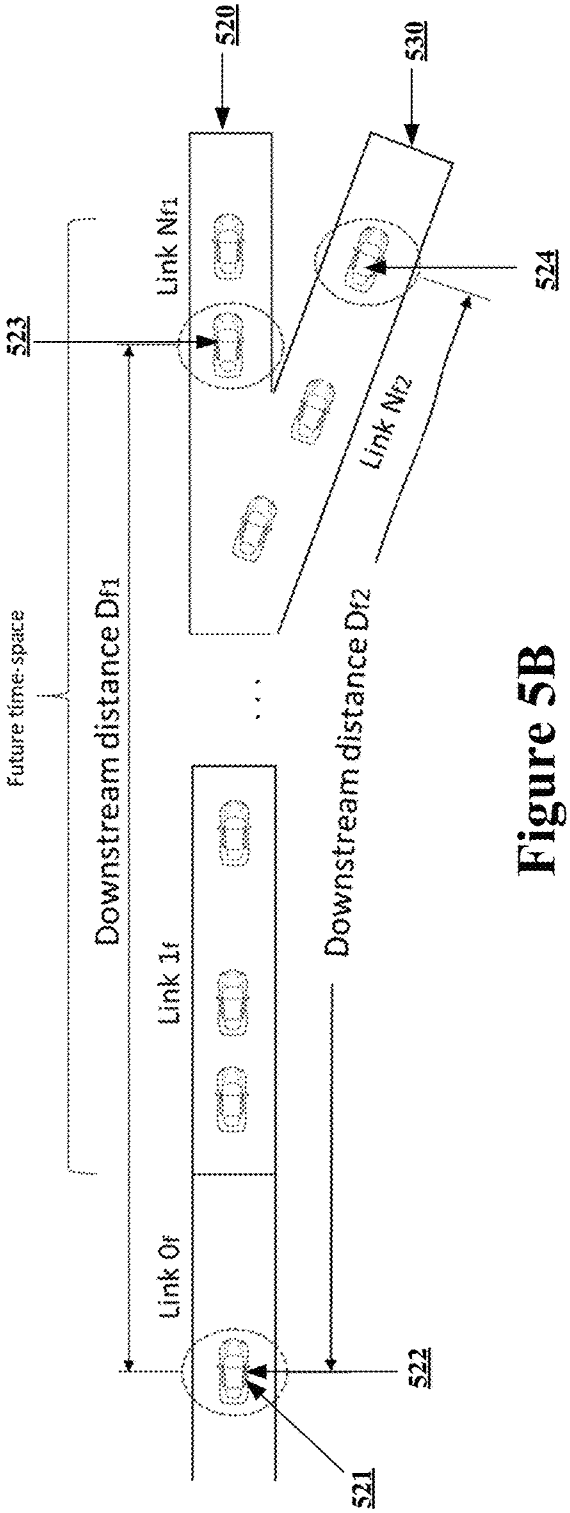
Figure 6:
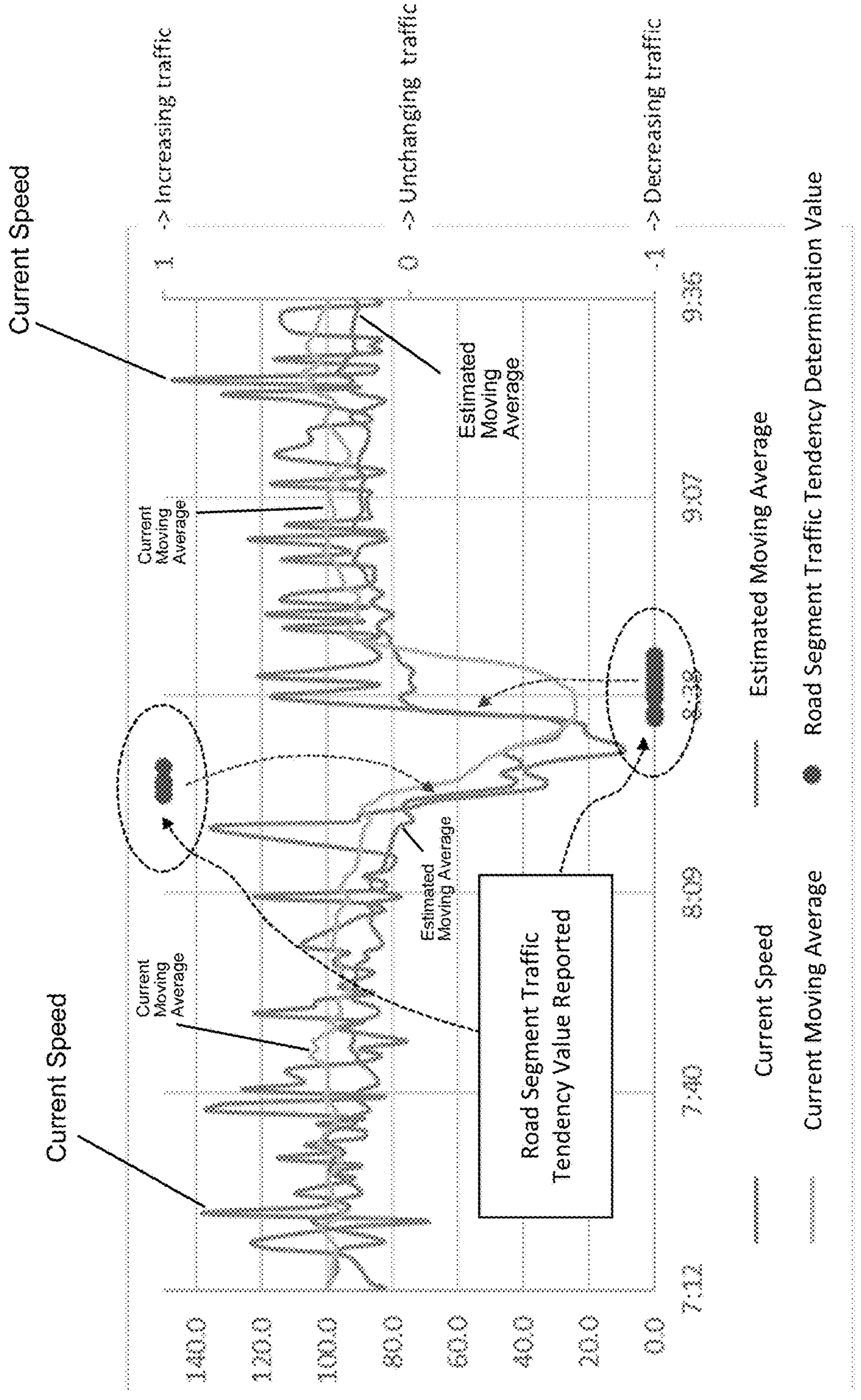

Having thus described certain embodiments of the invention in general terms, reference will now be made to the accompanying drawings, which are not necessarily drawn to scale, and wherein:

FIG. 1 is an apparatus that may be specifically configured in accordance with an example embodiment of the present disclosure in order to determine probe points and/or validate probe points in accordance with an example embodiment of the present disclosure;

FIG. 2 depicts a system that may be specifically configured in accordance with an example embodiment of the present disclosure to estimate a road segment traffic tendency determination value;

FIG. 3 is a flowchart illustrating the operations performed, such as by the apparatus of FIG. 1, in order to estimate a road segment traffic tendency determination value in accordance with an example embodiment of the present disclosure;

FIG. 4 is a flowchart illustrating the operations performed, such as by the apparatus of FIG. 1, for determining whether one or more comparison values satisfy one or more comparison value thresholds in accordance with an example embodiment of the present disclosure;

FIGS. 5A-B illustrate examples of a vehicle at an initial location and at an estimated downstream location in accordance with an example embodiment of the present disclosure;

FIG. 6 illustrates an example estimating the road segment traffic tendency determination in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms “data,” “content,” “information,” and similar terms may be used interchangeably to refer to data capable of being transmitted, received and/or stored in accordance with embodiments of the present invention. Thus, use of any such terms should not be taken to limit the spirit and scope of embodiments of the present invention.

As mentioned above, traffic estimation systems may provide traffic condition estimations for a given location at either a current moment in time or a future moment in time and typically primarily rely on the speed of vehicles on the road segment when making such determinations. Such traffic estimation systems, while acceptable for steady (i.e., unchanging) road conditions, fail to efficiently and accurately provide traffic condition estimations during traffic state change points. For example, a traffic estimation system may fail to accurately determine traffic condition estimations during periods when a traffic jam is forming and/or dissolving. This is due to the reliance of traditional traffic estimation systems on time speed series from vehicles at the particular location, which is also associated with high latency in traffic status reporting as such systems must receive several speed drop indications before determining a traffic jam is forming.

As discussed herein, a method, apparatus and computer program product are provided which allow for the estimation of a road segment tendency. In this regard, the method, apparatus and computer program product may generate a current TSP data object for an initial location of a vehicle and generate a future TSP data object for an estimated downstream location. A road segment traffic tendency determination value may be estimated based at least in part on the current TSP data object and the future TSP data object. A road segment traffic tendency notification may then be provided to the vehicle.

Advantageously, the use of a future TSP data object at an estimated downstream location for the vehicle allows for consideration of a spatial component for the vehicle and thus, a more accurate and efficient determination of a road segment traffic tendency determination. Furthermore, since a future TSP data object is generated and used in part to estimate a road segment traffic tendency determination value, a traffic processing system need not solely rely on received speed values from vehicles to determine a road segment traffic tendency determination, leading to lower latency and expenditure of less computational resources for the provision of the road segment traffic tendency notification to the vehicle.

FIG. 1 is a schematic diagram of an example apparatus 10 configured for performing any of the operations in accordance with an example embodiment as described herein. Apparatus 10 may be embodied by or associated with any of a variety of computing devices that include or are otherwise associated with a device configured for estimating a road segment traffic tendency determination value. In other embodiments of the apparatus, the apparatus itself may be embodied or partially embodied as server or any other network computing device, a computing device onboard a vehicle, a navigation device, a mobile terminal, such as a personal digital assistant (PDA), mobile telephone, smart phone, personal navigation device, smart watch, tablet computer, camera or any combination of the aforementioned.

Optionally, the apparatus 10 may be embodied by or associated with a plurality of computing devices that are in communication with or otherwise networked with one another such that the various functions performed by the apparatus may be divided between the plurality of computing devices that operate in collaboration with one another.

The apparatus 10 may include, be associated with, or may otherwise be in communication with a processing circuitry 12, which includes a processor 14 and a memory device 16, a communication interface 20, and a user interface 22. In some embodiments, the processor 14 (and/or co-processors or any other processing circuitry assisting or otherwise associated with the processor) may be in communication with the memory device 16 via a bus for passing information among components of the apparatus. The memory device 16 may be non-transitory and may include, for example, one or more volatile and/or non-volatile memories. In other words, for example, the memory device 16 may be an electronic storage device (for example, a computer readable storage medium) comprising gates configured to store data (for example, bits) that may be retrievable by a machine (for example, a computing device like the processor). The memory device 16 may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 14 may be embodied in a number of different ways. For example, the processor 14 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 14 may be configured to execute instructions stored in the memory device 16 or otherwise accessible to the processor. Alternatively or additionally, the processor 14 may be configured to execute hard coded functionality. As such, whether configured by hardware or software methods, or by a combination thereof, the processor 14 may represent an entity (for example, physically embodied in circuitry) capable of performing operations according to an embodiment of the present disclosure while configured accordingly. Thus, for example, when the processor 14 is embodied as an ASIC, FPGA or the like, the processor may be specifically configured hardware for conducting the operations described herein. Alternatively, as another example, when the processor 14 is embodied as an executor of software instructions, the instructions may specifically configure the processor to perform the algorithms and/or operations described herein when the instructions are executed. However, in some cases, the processor 14 may be a processor of a specific device (for example, the computing device) configured to employ an embodiment of the present invention by further configuration of the processor by instructions for performing the algorithms and/or operations described herein. The processor 14 may include, among other things, a clock, an arithmetic logic unit (ALU) and logic gates configured to support operation of the processor.

The apparatus 10 of an example embodiment may also include or otherwise be in communication with a user interface 22. The user interface 22 may include a touch screen display, a speaker, physical buttons, and/or other input/output mechanisms. In an example embodiment, the processor 14 may comprise user interface circuitry configured to control at least some functions of one or more input/output mechanisms. The processor 14 and/or user interface 22 comprising the processor may be configured to control one or more functions of one or more input/output mechanisms through computer program instructions (for example, software and/or firmware) stored on a memory accessible to the processor (for example, memory device 16, and/or the like). The user interface 22 may be embodied in the same housing as the processing circuitry. Alternatively, the user interface 22 may be separate from the processing circuitry 12.

The apparatus 10 of an example embodiment may also optionally include a communication interface 20 that may be any means such as a device or circuitry embodied in either hardware or a combination of hardware and software that is configured to receive and/or transmit data from/to other electronic devices in communication with the apparatus, such as by near field communication (NFC) or other proximity-based techniques, such as Bluetooth. Additionally or alternatively, the communication interface 20 may be configured to communicate via cellular or other wireless protocols including Global System for Mobile Communications (GSM), such as but not limited to 4G, 5G, and Long Term Evolution (LTE). In this regard, the communication interface 20 may include, for example, an antenna (or multiple antennas) and supporting hardware and/or software for enabling communications with a wireless communication network. Additionally or alternatively, the communication interface 20 may include the circuitry for interacting with the antenna(s) to cause transmission of signals via the antenna(s) or to handle receipt of signals received via the antenna(s). In some environments, the communication interface 20 may alternatively or also support wired or wireless communications.

FIG. 2 illustrates a communication diagram of an example embodiment of a system for implementing example embodiments described herein. The illustrated embodiment of FIG. 2 includes mobile devices 204, which may be, for example, a mobile phone, an in-vehicle navigation system, an advanced driving assistance system (ADAS), or the like, which may be, for example, the apparatus 10 of FIG. 1 and a traffic processing system 203 which may be embodied by, for example, the apparatus 10 of FIG. 1. Each of the mobile devices 204 and traffic processing system 203 may be in communication with at least one of the other elements illustrated in FIG. 2 via a network, such as network 201. The network 201 may be any form of wireless or partially wireless network as will be described further below. Additional, different, or fewer components may be provided. For example, many mobile devices 204 may be in communication with the traffic processing system 203. As another example, a mobile device 204 may be in communication with one or more third-party entities (not shown) which may be in communication with the traffic processing system 203, such as via the network 201.

The traffic processing system 203 may include a road segment traffic tendency determination engine 205. The road segment traffic tendency determination engine 205 may be configured to receive one or more vehicle attribute data objects, such as via network 201, from one or more vehicles within a proximity of an initial location. In some embodiments, the proximity is configured by one or more authorized end users The road segment traffic tendency determination engine 205 may further be configured to determine a current TSP attribute, a current SMA attribute, and/or a current speed attribute and generate a current TSP data object. In some embodiments, the road segment traffic tendency determination engine 205 may employ one or more current tendency machine learning models to generate a current TSP data object.

Additionally, the road segment traffic tendency determination engine 205 may be configured to receive one or more upstream vehicle attribute data objects, such as via network 201, from one or more vehicles within a proximity of an estimated upstream location. The road segment traffic tendency determination engine 205 may further be configured to determine an estimated TSP attribute, an estimated SMA attribute, and/or an estimated speed attribute and generate a future TSP data object. In some embodiments, the road segment traffic tendency determination engine 205 may employ one or more estimated tendency machine learning models to generate a future TSP data object.

In some embodiments, the traffic processing system 203 may be communicatively connected to a road segment geometry database 220. As such, the traffic processing system and/or road segment traffic tendency determination engine 205 may query, access, etc. the road segment geometry database 220. The road segment geometry database may store one or more road segment geometry maps, which define high-definition map data defining road segment geometry for a road network. The road segment geometry database may identify each of a plurality of road segments, one or more associated road segment links for a particular road segment, and/or associated one or more road segment attributes for each road segment. A road segment link may define a particular portion of a road segment. The road segment attributes may include location information. The location of each respective road segment link may be indicated by precise GPS coordinate set (e.g., latitude, longitude, and/or altitude) or a cartesian set (e.g., an x coordinate, y coordinate, and/or z coordinate). In some embodiments, the one or more road segment attributes may include one or more image data objects indicative of the surrounding area of the road segment link. The one or more image data objects may show, for example, one or more mile markers, road signs, and/or other identifying features which may be used to identify the location of the road segment link.

Referring now to FIG. 3, the operations performed, such as by the apparatus 10 of FIG. 1, in accordance with an example embodiment in order to estimate a road segment traffic tendency determination value.

At block 301 of FIG. 3, the apparatus 10 embodied by a computing device, such as road segment traffic tendency determination engine 205 of the traffic processing system 203 includes means, such as the processing circuitry 12, communication interface 20, or the like, for generating a current TSP data object. In some embodiments, the current TSP data object may correspond to a particular vehicle (i.e., a vehicle of interest) at an initial location. The current TSP data object may additionally or alternatively be associated with an initial timestamp value, indicative of the time associated with the current TSP data object. The initial timestamp value may correspond to the time a current TSP data object was generated, one or more vehicle attribute data objects were received, and/or one or more vehicle attribute data objects were captured by the one or more corresponding vehicles.

In some embodiments, the road segment traffic tendency determination engine 205 may receive one or more vehicle attribute data objects, such as via network 201, from one or more vehicles within an area. For example, a vehicle attribute data object may include one or more of a vehicle speed, set of coordinates (e.g., global positioning system (GPS) coordinates, latitude, longitude, a relative coordinate system (x, y, x), and/or the like), acceleration pattern, deceleration pattern, navigation pattern for one or more timestamps, and/or the like. Each vehicle attribute data object may be associated with a particular vehicle identifier, which may uniquely identify the vehicle corresponding to the vehicle attribute data object from other vehicles. As such, vehicle attribute data objects corresponding to the same vehicle identifier may be associated with one another.

In some embodiments, the road segment traffic tendency determination engine 205 may determine a current TSP attribute, a current SMA attribute, and/or a current speed attribute and generate the current TSP data object based at least in part on the one or more vehicle attribute data objects for a vehicle associated with a particular vehicle identifier. The road segment traffic tendency determination engine 205 may determine a current TSP attribute, SMA attribute, and/or a current speed attribute based at least in part on the one or more received vehicle attribute data objects. In some embodiments, the road segment traffic tendency determination engine 205 may use one or more mathematical and/or logical operations to determine a current TSP attribute, SMA attribute, and/or a current speed attribute for a vehicle at an initial location. For example, the current TSP attribute, SMA attribute, a current speed attribute may be determined for a vehicle based at least in part on the received vehicle attribute data objects from the particular vehicle and one or more additional vehicle attribute data objects from vehicles within a proximity (e.g., 0.5 miles) of the initial location of the vehicle of interest. For example, the road segment traffic tendency determination engine 205 may average each vehicle speed within the proximity of the initial location over a particular time window (e.g., 5 seconds), changes in speed over a particular time window, and/or the like to determine a current TSP attribute and/or SMA attribute for a vehicle.

In some embodiments, the road segment traffic tendency determination engine 205 may employ one or more current tendency machine learning models to generate a current TSP data object. The one or more current tendency machine learning models may be configured to process one or more vehicle attribute data objects, determine a current TSP attribute, a current SMA attribute, and/or a current speed attribute, and generate a current TSP data object for a vehicle associated with a particular vehicle identifier. The one or more current tendency machine learning models may be trained using ground truth data, such as from a current road segment traffic tendency determination training corpus. The current road segment traffic tendency determination training corpus may train the one or more machine learning models using one or more historical vehicle attribute data objects and associated ground truth current TSP data objects. The one or more current tendency machine learning models may periodically, semi-periodically, and/or upon request, be retrained such that the one or more current tendency machine learning models may accurately determine a current TSP attribute, a current SMA attribute, and/or a current speed attribute.

At block 302 of FIG. 3, the apparatus 10 embodied by a computing device, such as road segment traffic tendency determination engine 205 of the traffic processing system 203 includes means, such as the processing circuitry 12, or the like, for determining an estimated downstream location for the vehicle of interest. The road segment traffic tendency determination engine 205 may determine an estimated downstream location based at least in part on the current TSP data object and a future horizon timestamp change value.

A future horizon timestamp change value may indicate a time in the future for which to predict the vehicle location. For example, a future horizon timestamp change value may be a value of 5 minutes, 10 minutes, 15 minutes, 20 minutes, etc. As such, if a current TSP data object for a vehicle corresponds to an initial timestamp value of 1:00 pm and a future horizon timestamp change value of 5 minutes, the road segment traffic tendency determination engine 205 may be configured to determine a downstream location for the vehicle at a time of 1:05 pm.

The road segment traffic tendency determination engine 205 may determine an estimated downstream location using one or more mathematical and/or logical operations. In some embodiments, the road segment traffic tendency determination engine 205 may use one or more attributes from the current TSP data object (e.g., a current TSP attribute, a current SMA attribute, or a current speed attribute) to determine the downstream location of the vehicle for a future horizon timestamp change value. For example, if the current speed attribute for a vehicle has a value of 65 miles per hour, the road segment traffic tendency determination engine 205 may determine an estimated downstream location of approximately 16.25 miles downstream of the vehicles initial location for a future horizon timestamp change value of 15 minutes.

In some embodiments, the road segment traffic tendency determination engine 205 may determine an estimated downstream location based at least in part on associated navigational instructions for the vehicle. In some embodiments, the one or more vehicle attribute data objects may include associated navigational instructions for a vehicle. Alternatively, the road segment traffic tendency determination engine 205 may receive the associated navigational instructions for the vehicle separately from the one or more vehicle attribute data objects. The associated navigational instructions for a vehicle may describe an origin point and a destination point for the vehicle, as well as one or more road segments the vehicle will travel to reach the destination point. As such, the road segment traffic tendency determination engine 205 may use the associated navigational instructions for a vehicle when determining an estimated downstream location.

Additionally or alternatively, in some embodiments, the road segment traffic tendency determination engine 205 may provide a navigational route confirmation data object to one or more user devices associated with the vehicle, such as an onboard vehicle computer, associated user smartphone, etc. The navigational route confirmation data object may provide one or more user interactable prompts to confirm a navigational route the user operating the vehicle plans to use. For example, a navigational route confirmation data object may include a user interactable prompt which displays a route option A, B, C and ask the user to interact (touch, type, audibly confirm, etc.) to confirm the vehicle route. The road segment traffic tendency determination engine 205 may use one or more user responses to the navigational route confirmation data object to determine an estimated downstream location for the vehicle.

In some embodiments, the road segment traffic tendency determination engine 205 may additionally or alternatively use a road segment geometry database 220 to determine an estimated downstream location. The road segment geometry database may store one or more road segment geometry maps, which define high-definition map data defining road segment geometry for a road network. The road segment geometry database may identify each of a plurality of road segments, one or more associated road segment links for a particular road segment, and/or associated one or more road segment attributes for each road segment. A road segment link may define a particular portion of a road segment. The road segment traffic tendency determination engine 205 may use the road segment geometry database to determine one or more possible downstream locations for the vehicle using the high-definition map data defining road segment geometry for a road network. For example, the road segment traffic tendency determination engine 205 may use the road segment geometry database to determine the location of one or more road adjacent road segments, which may serve as the estimated downstream location.

An operational example of an estimated downstream location for a vehicle is depicted in FIGS. 5A-B. As shown in FIG. 5A, a vehicle 501 may begin at an initial location 502 and may be travelling on a road segment 510 at an initial time. In a first scenario, the road segment 510 may be experiencing heavy traffic such that the current speed attribute of the vehicle 501 is 20 miles per hour. As such, the road segment traffic tendency determination engine 205 may determine an estimated downstream location 503 for a future horizon timestamp value of 15 minutes, which may correspond to a location 5 miles downstream the initial location 502. In a different scenario, the road segment 510 may be experiencing light traffic such that the current speed attribute of the vehicle 501 is 50 miles per hour. As such, the road segment traffic tendency determination engine 205 may determine an estimated downstream location 504 for a future horizon timestamp value of 15 minutes, which may correspond to a location 12.5 miles downstream the initial location 502.

As another operational example, FIG. 5B depicts a vehicle 521 at an initial location 522 on a road segment 520. The vehicle 521 may be approaching a divergent road segment 530 within a future horizon timestamp value of 15 minutes such that the vehicle 521 may continue on road segment 520 or may turn onto road segment 530. The road segment traffic tendency determination engine 205 may determine an estimated downstream location based at least in part on associated navigational instructions for the vehicle. For example, if the navigational instructions for the vehicle 521 indicate the vehicle should turn onto road segment 530, the road segment traffic tendency determination engine 205 may determine the estimated downstream location 524 for a future horizon timestamp value of 15 minutes. As another example, if the navigational instructions for the vehicle 521 indicate the vehicle should continue on road segment 520, the road segment traffic tendency determination engine 205 may determine the estimated downstream location 523 for a future horizon timestamp value of 15 minutes.

Returning now to FIG. 3, at block 303 the apparatus 10 embodied by a computing device, such as road segment traffic tendency determination engine 205 of the traffic processing system 203 includes means, such as the processing circuitry 12, or the like, for generating a future TSP data object. In some embodiments, the future TSP data object may correspond to the particular vehicle (i.e., the vehicle of interest) associated with the current TSP data object at an estimated downstream location as determined at block 302. The future TSP data object may additionally or alternatively be associated with a future horizon timestamp value and/or future horizon timestamp change value, indicative of the time and/or time elapsed since the current TSP data object that is associated with the future TSP data object. The future horizon timestamp change value may indicate a time window in the future and the future horizon timestamp value may be the future time based at least in part on the current timestamp value and the future horizon timestamp change value. For example, if a current TSP data object for a vehicle corresponds to an initial timestamp value of 1:00 pm and a future horizon timestamp change value of 5 minutes, the future horizon timestamp value may be 1:05 pm.

In some embodiments, the road segment traffic tendency determination engine 205 may receive one or more upstream vehicle attribute data objects, such as via network 201, from one or more vehicles within an area corresponding to the estimated downstream location. For example, an upstream vehicle attribute data object may include one or more of a vehicle speed, set of coordinates (e.g., global positioning system (GPS) coordinates, latitude, longitude, a relative coordinate system (x, y, x), and/or the like), acceleration pattern, deceleration pattern, navigation pattern for one or more timestamps. Each upstream vehicle attribute data object may be associated with a particular vehicle identifier, which may uniquely identify the vehicle corresponding to the upstream vehicle attribute data object from other vehicles. As such, vehicle attribute data objects corresponding to the same vehicle identifier may be associated with one another.

In some embodiments, the road segment traffic tendency determination engine 205 may determine an estimated TSP attribute, an estimated SMA attribute, and/or an estimated speed attribute and generate the future TSP data object based at least in part on the one or more upstream vehicle attribute data objects for one or more vehicles which are located within an estimated downstream location proximity. In some embodiments, the estimated downstream proximity is configured by one or more authorized end users. The road segment traffic tendency determination engine 205 may determine an estimated TSP attribute, estimated SMA attribute, and/or estimated speed attribute based at least in part on the one or more received upstream vehicle attribute data objects. In some embodiments, the road segment traffic tendency determination engine 205 may use one or more mathematical and/or logical operations to determine an estimated TSP attribute, estimated SMA attribute, and/or estimated speed attribute for a vehicle at an estimated downstream location. For example, the estimated TSP attribute, estimated SMA attribute, and/or estimated speed attribute may be determined for a vehicle based at least in part on the received upstream vehicle attribute data objects from the upstream vehicle within a proximity (e.g., 0.5 miles) of the estimated upstream location. The road segment traffic tendency determination engine 205 may average each vehicle speed within the proximity of the estimated upstream location over a particular time window (e.g., 5 seconds), changes in speed over a particular time window, and/or the like to determine an estimated TSP attribute and/or an estimated SMA attribute for a vehicle.

In some embodiments, the road segment traffic tendency determination engine 205 may employ one or more estimated tendency machine learning models to generate a future TSP data object. The one or more estimated tendency machine learning models may be configured to process one or more upstream vehicle attribute data objects, determine an estimated TSP attribute, an estimated SMA attribute, and/or an estimated speed attribute, and generate an estimated TSP data object for a vehicle associated with a particular vehicle identifier. The one or more estimated tendency machine learning models may be trained using ground truth data, such as from an estimated road segment traffic tendency determination training corpus. The estimated road segment traffic tendency determination training corpus may train the one or more machine learning models using one or more historical upstream vehicle attribute data objects and associated ground truth future TSP data objects. The one or more estimated tendency machine learning models may periodically, semi-periodically, and/or upon request, be retrained such that the one or more estimated tendency machine learning models may accurately determine an estimated TSP attribute, an estimated SMA attribute, and/or an estimated speed attribute.

At block 304 of FIG. 3, the apparatus 10 embodied by a computing device, such as road segment traffic tendency determination engine 205 of the traffic processing system 203 includes means, such as the processing circuitry 12, or the like, for estimating a road segment traffic tendency determination value. The road segment traffic tendency determination engine 205 may estimate the road segment traffic tendency determination value based at least in part on the current TSP data object and the future TSP data object. In some embodiments, the road segment traffic tendency determination value may be a numerical value. The road segment traffic tendency determination value may further be indicative of a particular road segment traffic tendency category. In some embodiments, road segment traffic tendency determination values may include values of −1, 0, and 1. Each road segment traffic tendency determination value may correspond to a particular road segment traffic tendency category, as will be discussed in greater detail with respect to block 305.

In some embodiments, the road segment traffic tendency determination value may be based at least in part on whether one or more comparison values satisfy one or more comparison value thresholds. For example, if a comparison value satisfies a first comparison value but not a second comparison value threshold, the road segment determination engine 205 may determine a road segment traffic tendency value of −1.

In some embodiments, block 305 may be performed in accordance with the various steps/operations of the process 400 depicted in FIG. 4, which is a flowchart diagram of an example process for determining whether one or more comparison values satisfy one or more comparison value thresholds.

At block 401 of FIG. 4, the apparatus 10 embodied by a computing device, such as road segment traffic tendency determination engine 205 includes means, such as the processing circuitry 12, or the like, for determining one or more comparison values. In some embodiments, the road segment traffic tendency determination engine 205 may be configured to select one or more attributes described by a current data object and/or one or more attributes described by a future data object and perform one or more mathematical and/or logical operations on the selected attributes to determine the one or more comparison values.

For example, the road segment traffic tendency determination engine 205 may be configured to select a current speed attribute described by the current TSP data object and the current SMA attribute described by a current TSP data object and determine a comparison value based at least in part on performing one or more mathematical and/or logical operations on the selected attributes. For example, the current speed attribute may be subtracted from the current SMA to determine a comparison value.

As another example, the road segment traffic tendency determination engine 205 may be configured to select a current TSP attribute described by the current TSP data object and an estimated TSP data attribute described by the future TSP data object and determine a comparison value based at least in part on performing one or more mathematical and/or logical operations on the selected attributes. For example, the estimated TSP attribute may be subtracted from the current TSP attribute to determine a comparison value.

As yet another example, the road segment traffic tendency determination engine 205 may be configured to select a current SMA attribute described by the current TSP data object and an estimated SMA attribute described by the future TSP data object and determine a comparison value based at least in part on performing one or more mathematical and/or logical operations on the selected attributes. For example, the current SMA attribute may be subtracted from the estimated SMA attribute and divided by the current SMA to determine a comparison value.

Although the above examples describe specific instances of determining a comparison value, any attribute of the current TSP data object and/or future pattern data object may be used to determine the one or more comparison values.

At block 402 of FIG. 4, the apparatus 10 embodied by a computing device, such as road segment traffic tendency determination engine 205 includes means, such as the processing circuitry 12, or the like, for determining whether the one or more comparison values satisfy one or more comparison value thresholds. Each comparison value determination may be associated with one or more comparison value thresholds, which may be automatically determined by the road segment traffic tendency determination engine 205 and/or may be selected by one or more authorized end users. The one or more comparison values determined at block 401 may be compared to the one or more corresponding comparison value thresholds. For example, a comparison value determined based at least in part on the current SMA attribute described by the current TSP data object and the estimated SMA attribute described by the future TSP data object may be associated comparison threshold values of 0.2 and −0.2. As such, the road segment traffic tendency determination engine 205 may whether the comparison value satisfies both the comparison threshold values of 0.2 and −0.2.

At block 403 of FIG. 4, the apparatus 10 embodied by a computing device, such as road segment traffic tendency determination engine 205 includes means, such as the processing circuitry 12, or the like, for estimating the road segment traffic tendency determination value based at least in part on whether the one or more comparison values satisfy the one or more comparison value thresholds. By way of continuing example, the road segment traffic tendency determination engine 205 may whether the comparison value satisfies both the comparison threshold values of 0.2 and −0.2. The road segment traffic tendency determination engine 205 may determine whether the comparison value is below the comparison threshold value of −0.2 such that the comparison value satisfies the comparison threshold value, and in an instance the comparison value is below the comparison value threshold of −0.2, may estimate the road segment traffic tendency determination value to be 1. The road segment traffic tendency determination engine 205 may also determine whether the comparison value is above 0.2 such that the comparison value satisfies the comparison value threshold, and in an instance the comparison value is above the comparison value threshold of 0.2, may estimate the road segment traffic tendency determination value to be −1. In an instance the road segment traffic tendency determination engine 205 determines the comparison value fails to satisfy the −0.2 and 0.2 comparison threshold values (e.g., the comparison value is greater than the comparison value threshold of −0.2 and less than the comparison value threshold 0.2), the road segment traffic tendency determination engine 205 may estimate the road segment traffic tendency determination value to be 0.

FIG. 6 depicts an operational example of estimating the road segment traffic tendency determination value based at least in part on whether the one or more comparison values satisfy the one or more comparison value thresholds. As depicted in FIG. 6, a current speed and current SMA, as described by a current TSP data object is plotted as a function of time along with an estimated SMA as described by a future TSP data object. The road segment traffic tendency determination engine 205 may use the one or more attributes to one or more comparison values and determine whether the one or more comparison values satisfy the one or more comparison value thresholds in any of the ways described above. The road segment traffic tendency determination engine 205 may then determine the road segment traffic tendency value (e.g., −1, 0, and 1) in real-time or near real-time such that the road segment traffic tendency value is reported with relatively low latency.

At block 305 of FIG. 3, the apparatus 10 embodied by a computing device, such as road segment traffic tendency determination engine 205 of the traffic processing system 203 includes means, such as the processing circuitry 12, or the like, for assigning a road segment traffic tendency category. As mentioned above, the road segment traffic tendency determination value may further be indicative of a particular road segment traffic tendency category. Each road segment traffic tendency determination value may correspond to a particular road segment traffic tendency category. The road segment traffic tendency determination engine 205 may be configured to select the road segment traffic tendency category from amongst a plurality of candidate road segment traffic tendency categories. The plurality of candidate road segment traffic tendency categories may include a traffic increasing category, a traffic decreasing category, or no change category. Each candidate road segment traffic tendency category may correspond to a particular road segment determination value. For example, the traffic increasing category may correspond to a road segment traffic tendency determination value of 1, a traffic decreasing category may correspond to a road segment traffic tendency determination value of −1, and a no change category may correspond to a road segment traffic tendency determination value of 0. As such, the road segment traffic tendency determination engine 205 may assign the road segment traffic tendency category based at least in part on the road segment traffic tendency determination value.

At block 306 of FIG. 3, the apparatus 10 embodied by a computing device, such as road segment traffic tendency determination engine 205 of the traffic processing system 203 includes means, such as the processing circuitry 12, communication interface 20, or the like, for causing a road segment notification to be provided to the vehicle. In some embodiments, the road segment notification may describe the road segment traffic tendency determination value. In some embodiments, the road segment notification may describe the corresponding road segment traffic tendency category. In some embodiments, the road segment traffic tendency category may describe the future horizon timestamp change value and a downstream location value corresponding to the future TSP data object. In some embodiments, the provision of the road segment notification may cause the vehicle to display the data described by the road segment notification to one or more users such that the one or more users may be informed of the road segment traffic tendency expected at the estimated downstream location at the future horizon time. Additionally or alternatively, the road segment notification may be provided to one or more associated user devices, such as one or more associated smartphones.

At block 307 of FIG. 3, the apparatus 10 embodied by a computing device, such as road segment traffic tendency determination engine 205 of the traffic processing system 203 includes means, such as the processing circuitry 12, communication interface 20, or the like, for causing one or more navigational instructions to be provided to the vehicle. In some embodiments, the road segment traffic tendency determination engine 205 may use road segment traffic tendency determination value to determine one or more navigational instructions. In some embodiments, the road segment traffic tendency determination engine 205 may be configured to determine a route from an origin point to a destination point, either automatically or upon receipt of a request from a user device. The road segment traffic tendency determination engine 205 may use the road segment traffic tendency determination value to determine and/or update the one or more navigational instructions for a route. For example, if a road segment traffic tendency determination value is determined to be −1 such that traffic is expected to increase, the road segment determination engine 205 may update the one or more navigational instructions to avoid the estimated upstream location if possible.

As such, the methods, apparatuses and computer program products provided in accordance with example embodiments described above are capable of estimation of road segment tendency. A current TSP data object for an initial location of a vehicle and a future TSP data object for an estimated downstream location may be generated and used in part to estimate a road segment traffic tendency determination value. A road segment traffic tendency notification may then be provided to the vehicle. Advantageously, the use of a future TSP data object at an estimated downstream location for the vehicle allows for consideration of a spatial component for the vehicle and thus, a more accurate and efficient determination of a road segment traffic tendency determination. Furthermore, since a future TSP data object is generated and used in part to estimate a road segment traffic tendency determination value, a traffic processing system need not solely rely on received speed values from vehicles to determine a road segment traffic tendency determination, leading to lower latency and less computational resources used during provision of the road segment traffic tendency notification to the vehicle.

FIGS. 3-4 illustrate flowcharts of an apparatus, method and computer program product according to example embodiments of the invention. It will be understood that each block of the flowcharts, and combinations of blocks in the flowcharts, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 16 of an apparatus 10 employing an embodiment of the present invention and executed by a processing circuitry 12 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A method for estimating a road segment traffic tendency determination value, the method comprising:

determining, responsive to a request from a user device, one or more navigational instructions comprising a route from an origin point to a destination point;

receiving, via a network, one or more vehicle attribute data objects from one or more vehicles within a proximity of an initial location of a vehicle;

generating a current traffic speed pattern data object for the initial location of the vehicle based on the one or more vehicle attribute data objects, wherein the current traffic speed pattern data object comprises at least one of a current traffic speed pattern attribute, a current speed moving average attribute, or a current speed attribute;

receiving, via the network, one or more upstream vehicle attribute data objects from one or more vehicles within a proximity of an estimated upstream location of the vehicle;

generating a future traffic speed pattern data object for the vehicle at an estimated downstream location based at least in part on the current traffic speed pattern data object and the one or more upstream vehicle attribute data objects, wherein the future traffic speed pattern data object comprises at least one of an estimated traffic speed pattern attribute, an estimated speed moving average attribute, or an estimated speed attribute;

estimating a road segment traffic tendency determination value based at least in part on the current traffic speed pattern data object and the future traffic speed pattern data object, wherein the road segment traffic tendency determination value is indicative of a road segment traffic tendency category; and updating the one or more navigational instructions based at least in part on the road segment traffic tendency determination value indicative of the road segment traffic tendency category and causing the one or more navigational instructions, as updated, to be provided to the vehicle, wherein the one or more navigational instructions comprise instructions to avoid the estimated downstream location.

2. The method of claim 1, the method further comprising:

determining the estimated downstream location for the vehicle based at least in part on the current traffic speed pattern data object for the vehicle and a future horizon timestamp change value.

3. The method of claim 1, the method further comprising:

determining one or more comparison values by comparing one or more attributes described by the current traffic speed pattern data object to one or more attributes described by the future traffic speed pattern data object; and determining whether the one or more comparison values satisfy one or more comparison value thresholds, wherein estimating the road segment traffic tendency determination value based at least in part on whether the one or more comparison values satisfy the one or more comparison value thresholds.

4. The method of claim 1, wherein a plurality of candidate road segment traffic tendency categories may include a traffic increasing category, a traffic decreasing category, or no change category.

5. The method of claim 1, wherein the road segment traffic tendency notification further comprises the future horizon timestamp change value and a downstream location value corresponding to the future traffic speed pattern data object.

6. An apparatus comprising:

processor circuitry; and at least one memory including computer program code, the at least one memory and the computer program code configured to, with the processing circuitry, cause the apparatus at least to:

determine, responsive to a request from a user device, one or more navigational instructions comprising a route from an origin point to a destination point;

receive, via a network, one or more vehicle attribute data objects from one or more vehicles within a proximity of an initial location of a vehicle;

generate a current traffic speed pattern data object for the initial location of the vehicle based on the one or more vehicle attribute data objects, wherein the current traffic speed pattern data object comprises at least one of a current traffic speed pattern attribute, a current speed moving average attribute, or a current speed attribute;

receive, via the network, one or more upstream vehicle attribute data objects from one or more vehicles within a proximity of an estimated upstream location of the vehicle;

generate a future traffic speed pattern data object for the vehicle at an estimated downstream location based at least in part on the current traffic speed pattern data object and the one or more upstream vehicle attribute data objects, wherein the future traffic speed pattern data object comprises at least one of an estimated traffic speed pattern attribute, an estimated speed moving average attribute, or an estimated speed attribute;

estimate a road segment traffic tendency determination value based at least in part on the current traffic speed pattern data object and the future traffic speed pattern data object, wherein the road segment traffic tendency determination value is indicative of a road segment traffic tendency category; and update the one or more navigational instructions based at least in part on the road segment traffic tendency determination value indicative of the road segment traffic tendency category and cause the one or more navigational instructions, as updated, to be provided to the vehicle, wherein the one or more navigational instructions comprise instructions to avoid the estimated downstream location.

7. The apparatus of claim 6, wherein the at least one memory and the computer program code configured to, with the processing circuitry, cause the apparatus at least to:

determine the estimated downstream location for the vehicle based at least in part on the current traffic speed pattern data object for the vehicle and a future horizon timestamp change value.

8. The apparatus of claim 6, wherein the at least one memory and the computer program code configured to, with the processing circuitry, cause the apparatus at least to:

determine one or more comparison values by comparing one or more attributes described by the current traffic speed pattern data object to one or more attributes described by the future traffic speed pattern data object; and determine whether the one or more comparison values satisfy one or more comparison value thresholds, wherein estimating the road segment traffic tendency determination value based at least in part on whether the one or more comparison values satisfy the one or more comparison value thresholds.

9. The apparatus of claim 6, wherein a plurality of candidate road segment traffic tendency categories may include a traffic increasing category, a traffic decreasing category, or no change category.

10. The apparatus of claim 6, wherein the road segment traffic tendency notification further comprises the future horizon timestamp change value and a downstream location value corresponding to the future traffic speed pattern data object.

11. A computer program product comprising at least one non-transitory computer-readable storage medium having computer-executable program code portions stored therein, the computer-executable program code portions comprising program code instructions configured to:

determine responsive to a request from a user device, one or more navigational instructions comprising a route from an origin point to a destination point;

receive, via a network, one or more vehicle attribute data objects from one or more vehicles within a proximity of an initial location of a vehicle;

generate a current traffic speed pattern data object for the initial location of the vehicle based on the one or more vehicle attribute data objects, wherein the current traffic speed pattern data object comprises at least one of a current traffic speed pattern attribute, a current speed moving average attribute, or a current speed attribute;

receive, via the network, one or more upstream vehicle attribute data objects from one or more vehicles within a proximity of an estimated upstream location of the vehicle;

generate a future traffic speed pattern data object for the vehicle at an estimated downstream location based at least in part on the current traffic speed pattern data object and the one or more upstream vehicle attribute data objects, wherein the future traffic speed pattern data object comprises at least one of an estimated traffic speed pattern attribute, an estimated speed moving average attribute, or an estimated speed attribute;

estimate a road segment traffic tendency determination value based at least in part on the current traffic speed pattern data object and the future traffic speed pattern data object, wherein the road segment traffic tendency determination value is indicative of a road segment traffic tendency category; and update the one or more navigational instructions based at least in part on the road segment traffic tendency determination value indicative of the road segment traffic tendency category and cause the one or more navigational instructions, as updated, to be provided to the vehicle, wherein the one or more navigational instructions comprise instructions to avoid the estimated downstream location.

12. The computer program product of claim 11, wherein the computer-executable program code portions comprising program code instructions are further configured to:

determine the estimated downstream location for the vehicle based at least in part on the current traffic speed pattern data object for the vehicle and a future horizon timestamp change value.

13. The computer program product of claim 11, wherein the computer-executable program code portions comprising program code instructions are further configured to:

determine one or more comparison values by comparing one or more attributes described by the current traffic speed pattern data object to one or more attributes described by the future traffic speed pattern data object; and determine whether the one or more comparison values satisfy one or more comparison value thresholds, wherein estimating the road segment traffic tendency determination value based at least in part on whether the one or more comparison values satisfy the one or more comparison value thresholds.

14. The computer program product of claim 11, wherein a plurality of candidate road segment traffic tendency categories may include a traffic increasing category, a traffic decreasing category, or no change category.

15. The computer program product of claim 11, wherein the road segment traffic tendency notification further comprises the future horizon timestamp change value and a downstream location value corresponding to the future traffic speed pattern data object.

* * * * *